US010434922B2

United States Patent
Ross, Sr. et al.

(10) Patent No.: US 10,434,922 B2
(45) Date of Patent: Oct. 8, 2019

(54) INERTIA-DRIVEN DUMP LOAD CONTAINER FOR VEHICLES

(71) Applicants: Douglas Alexander Ross, Sr., Sebring, FL (US); Deborah Starwalt Feldman, Sebring, FL (US)

(72) Inventors: Douglas Alexander Ross, Sr., Sebring, FL (US); Deborah Starwalt Feldman, Sebring, FL (US)

( * ) Notice: Subject to any disclaimer, the term of this patent is extended or adjusted under 35 U.S.C. 154(b) by 15 days.

(21) Appl. No.: 15/704,570

(22) Filed: Sep. 14, 2017

(65) Prior Publication Data

US 2018/0079346 A1    Mar. 22, 2018

Related U.S. Application Data

(60) Provisional application No. 62/395,432, filed on Sep. 16, 2016.

(51) Int. Cl.

| | |
|---|---|
| *B60P 1/30* | (2006.01) |
| *B60R 9/00* | (2006.01) |
| *B60P 1/28* | (2006.01) |
| *B60P 1/00* | (2006.01) |
| *B60P 1/32* | (2006.01) |

(52) U.S. Cl.
CPC ............. *B60P 1/30* (2013.01); *B60P 1/003* (2013.01); *B60P 1/28* (2013.01); *B60P 1/32* (2013.01); *B60R 9/00* (2013.01)

(58) Field of Classification Search
CPC ... B60P 1/30; B60P 1/28; B61D 47/00; B61D 47/005
See application file for complete search history.

(56) References Cited

U.S. PATENT DOCUMENTS

| | | | | |
|---|---|---|---|---|
| 5,353,216 A | * | 10/1994 | Ayers .................. | H02M 7/00 361/732 |
| 5,454,684 A | * | 10/1995 | Berens ................. | B60P 1/04 296/26.1 |
| 5,496,145 A | * | 3/1996 | Monin ................ | A01K 5/01 119/59 |
| 6,077,024 A | * | 6/2000 | Trueblood .......... | B60P 1/003 224/404 |
| 9,840,180 B2 | * | 12/2017 | Killgour ............. | B60P 1/30 |
| 2005/0031438 A1 | * | 2/2005 | Copus ................ | B60P 1/24 414/467 |
| 2014/0333090 A1 | * | 11/2014 | Garcia-Huidobro Valdivieso ....... | B60P 1/286 296/183.2 |
| 2015/0251709 A1 | * | 9/2015 | Moorman ............ | B60P 1/04 298/17 R |

* cited by examiner

*Primary Examiner* — Hilary L Gutman
(74) *Attorney, Agent, or Firm* — Renner, Kenner, Greive, Bobak, Taylor & Weber Co., L.P.A.

(57) ABSTRACT

An inertia-driven dump load apparatus is provided in association with motor vehicles. The inertia-driven dump load includes a container defined by two side walls and a front wall; and at least one pivotable connection means connecting the container to the vehicle bed. To operate the inertia-driven dump load apparatus, the apparatus is first placed within a vehicle bed. Once the apparatus is in place, material to be dumped can be loaded into the apparatus. Then, the vehicle is driven to a location where the dumping of the materials is desired. Finally, a force is applied to the apparatus such that the apparatus moves across the vehicle bed so that the apparatus tips over a tailgate of the vehicle bed so that the material to be dumped is dumped.

5 Claims, 5 Drawing Sheets

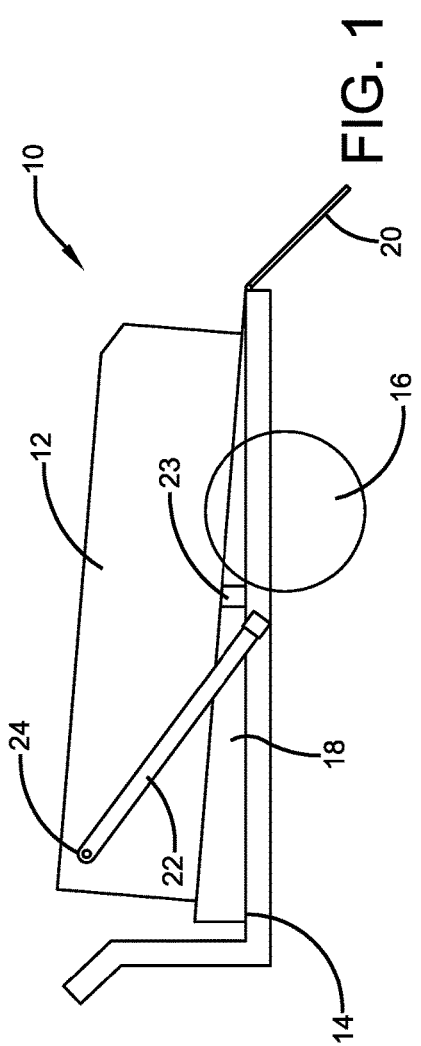
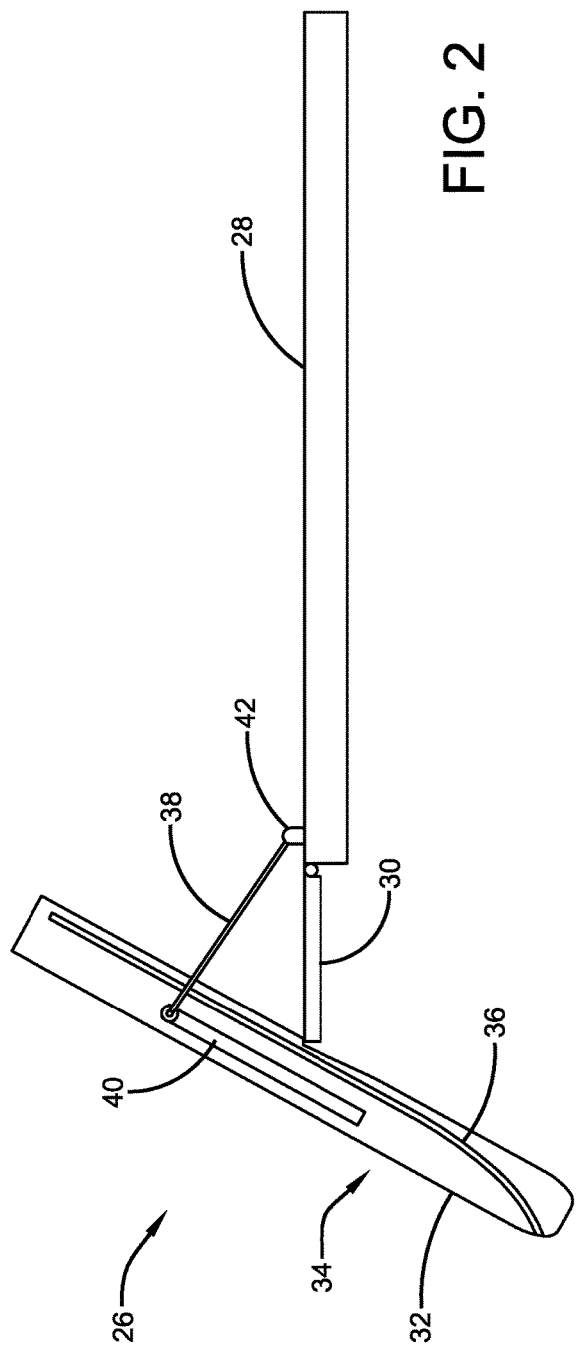

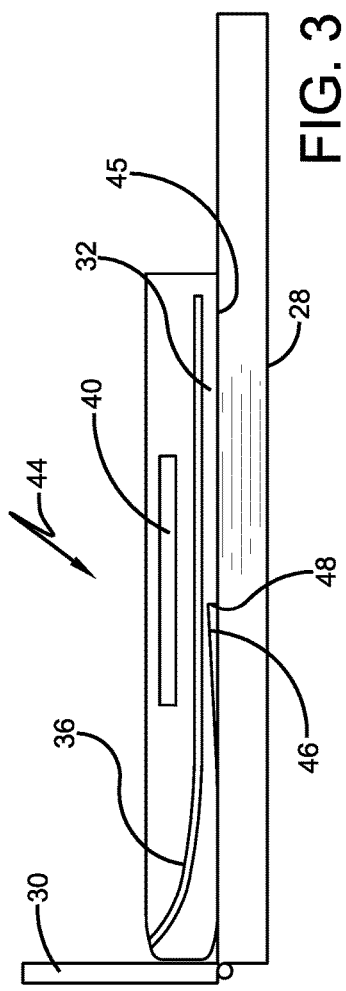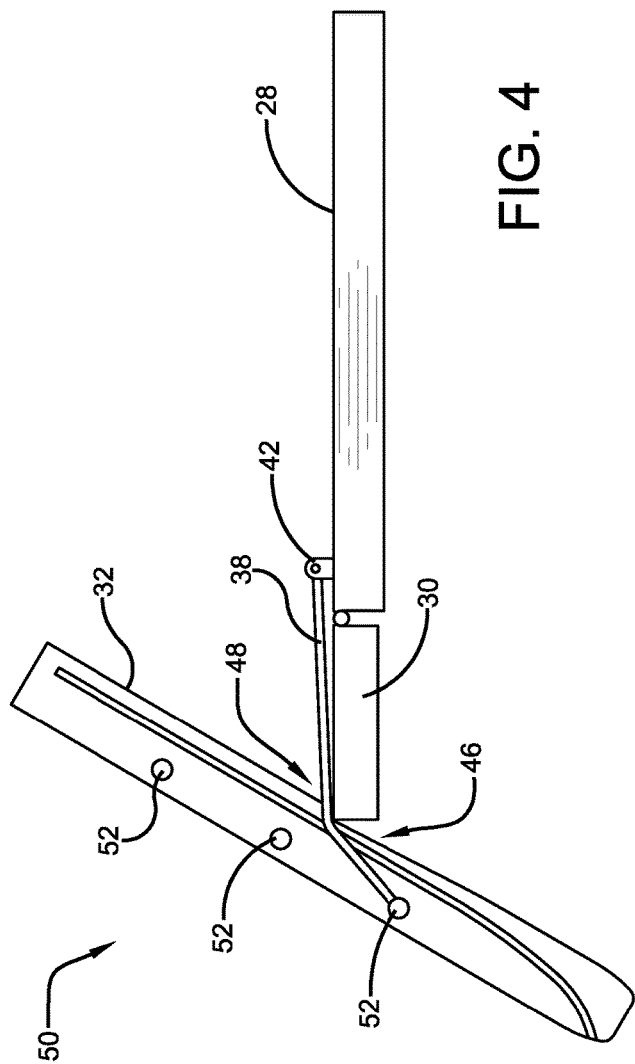

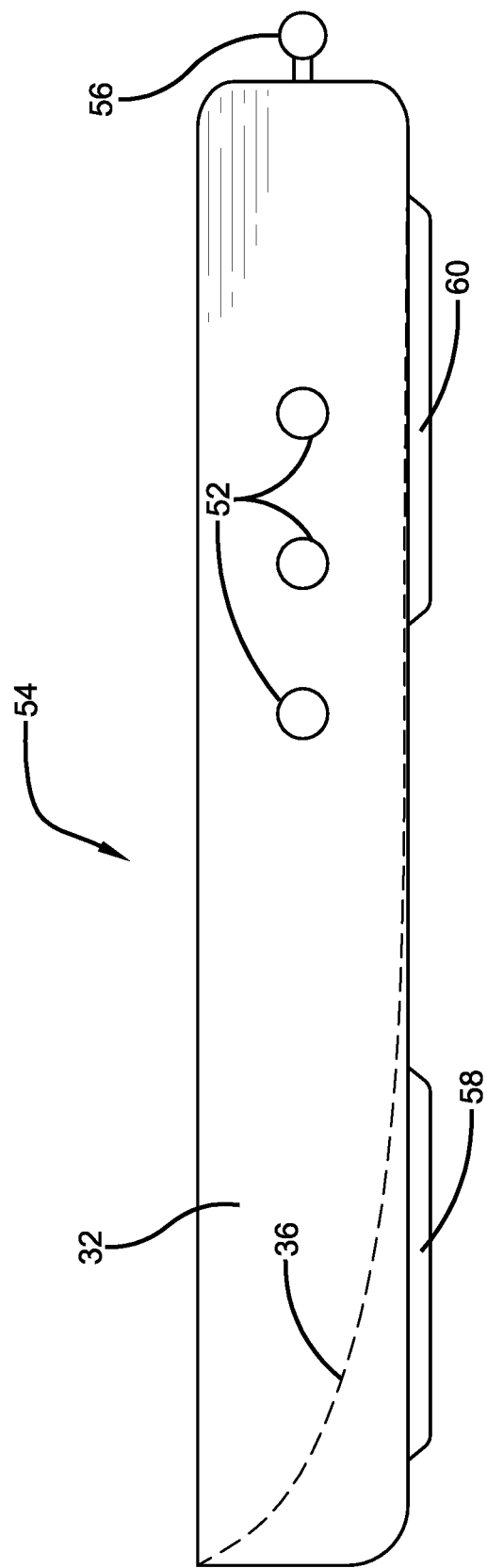

INERTIA-DRIVEN DUMP LOAD CONTAINER FOR VEHICLES

CROSS-REFERENCE TO RELATED APPLICATIONS

This application claims priority from U.S. Provisional Application No. 62/395,432 filed on Sep. 16, 2016, the contents of which are incorporated herein by reference.

FIELD OF THE INVENTION

The invention herein resides in the art of an apparatus for receiving, maintaining and transporting materials from one location to another and for easily "dumping" the materials upon the materials reaching their intended destination. More particularly, the invention relates to an apparatus that may be readily received by the bed of known pickup trucks, trailers, and the like that may receive such materials and maintain them separate and apart from the pickup bed or trailer. More particularly, the invention relates to a basket that may be slidingly received by a trailer or a pickup truck bed and which may be readily moved with respect thereto a tipping point where the basket pivots about its center of gravity and dumps the material from the basket to a location immediately below.

BACKGROUND OF THE INVENTION

Most dump trucks require some form of hydraulic system to tip the material out of the cargo body. These systems are complex and costly as original equipment, and require sophisticated installation and retrofitting for aftermarket use. Of course, dumping systems are most desirable because the unloading of the material is quickly, effortlessly, and effectively achieved by simply tipping the cargo compartment by means of an appropriate hydraulic system.

There is a need, however, for a cost-effective dump-type system that requires little or no installation, fits a broad range of truck or trailer bodies and beds, and uses both gravity and the inertia from the vehicle itself to tip or dump the material from the truck or trailer to a final destination. Such a system would be most cost-effective for homeowners, landscapers, and others having the occasional need for receiving and transporting material, or for transporting purchased materials to a final work site and then to readily unload those materials by quickly dumping them from the vehicle.

Indeed, there is a need in the art for a method and apparatus that can convert virtually any truck or trailer into a dump truck at a fraction of the cost of traditional dump load systems, while still providing cost-effective operation.

SUMMARY OF THE INVENTION

In light of the foregoing, it is an aspect of the present invention to provide an inertia-driven dump load apparatus for vehicles that is adaptable for use by a broad range of existing pickup trucks and trailers.

Still another aspect of the invention is to provide an inertia-driven dump load apparatus for vehicles that requires no hydraulics and minimal, if any, manual exertion to effect the dumping operation.

Another aspect of the invention is to provide an inertia-driven dump load apparatus for vehicles that requires minimal attachment to a pickup truck bed or trailer while ensuring effective operation therewith.

Still another aspect of the invention is the provision of an inertia-driven dump load apparatus for vehicles that may be readily interconnected with existing pickup truck beds and trailers with minimal, if any, modification.

Yet another aspect of the invention is the provision of an inertia-driven dump load apparatus for vehicles that may be readily produced using state-of-the-art methods, apparatus, and techniques.

The foregoing and other aspects of the invention will become apparent as the detailed description proceeds.

BRIEF DESCRIPTION OF THE DRAWINGS

The invention presented herein is shown illustratively in the accompanying drawings wherein:

FIG. 1 is an illustrative view of a first embodiment of the inertia-driven dump load apparatus for vehicles made in accordance with the invention;

FIG. 2 is an illustration of a second embodiment of the inertia-driven dump load apparatus for vehicles made in accordance with the invention;

FIG. 3 is an illustration of yet another embodiment of the inertia-driven dump load apparatus for vehicles made in accordance with the invention showing an apparatus having an undercut bottom area and a lip for engaging a tailgate edge;

FIG. 4 is an illustrative view of yet a fourth embodiment of the inertia-driven dump load apparatus for vehicles made in accordance with the invention showing a method of interconnecting the apparatus of FIG. 3 with a pickup truck or trailer bed;

FIG. 5 is an illustrative side view of a basket employed with the concept of the inertia-driven dump load apparatus for vehicles made in accordance with the invention showing front and rear pairs of skids or sleds for facilitating the movement of the basket upon the floor of the pickup truck bed or trailer;

DETAILED DESCRIPTION OF PREFERRED EMBODIMENTS

Figure 6:
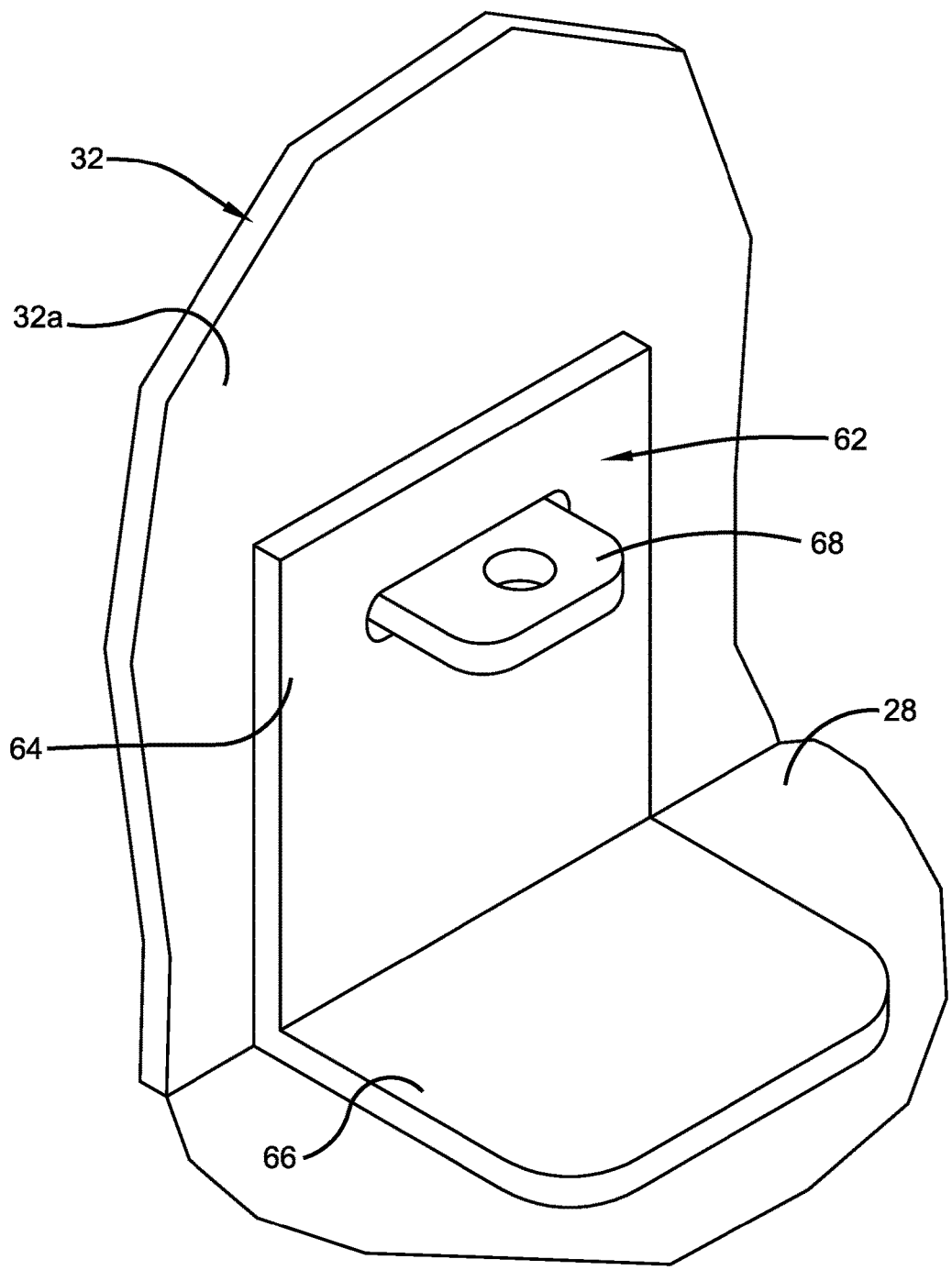
FIG. 6 is an illustrative rear view of a basket employed with the concept of the inertia-driven dump load apparatus for vehicles made in accordance with the invention showing a lock mechanism.

Referring now to the drawings and more particularly FIG. 1, it can be seen that an inertia-driven dump load apparatus for vehicles made in accordance with the invention is designated generally by the numeral 10. The invention contemplates the implementation of a basket 12 to be received upon a trailer or pickup truck bed 14. As shown, apparatus 10 is contemplated for use on a wheeled vehicle as designated by one of at least a pair of wheels 16. According to one embodiment of the invention, apparatus 10 employs an inclined liner or sled 18, which is raised at the front in comparison to the rear. It will be appreciated that the sled 18 is optional, not being required for effective operation of apparatus 10. However, those skilled in the art will appreciate that a slight grade or slope toward the rear of the bed or trailer will facilitate movement of basket 12 toward the rear. In somewhat standard fashion, trailer or bed 14 includes a tailgate 20, which may drop angularly for trailers or the like, as shown, or may drop to a position of a parallel extension of the bed of a pickup truck or the like as shown in FIG. 2.

A pivot arm 22 is pivotally connected as at 24 to a side of basket 12. As basket 12 is slid rearwardly to a point where its center of gravity has extended beyond the end of trailer or bed 14 such that basket 12 tips downwardly, the pivot arm 22 will engage an appropriate stop 23 or the like in trailer or bed 14. It will be appreciated by those skilled in the art that it is most preferable that there be two pivot arms 22, one positioned on each longitudinal side of basket 12. It will also be appreciated by those skilled in the art that pivot arm 22 might be replaced by a cord, chain or the like secured at one end at 24 and at the other to the trailer or bed 14. Although shown in the drawings as being pivotally connected to a side of basket 12, in one or more embodiments, pivot arm(s) 22 may be pivotally connected to the bottom of basket 12, in particular at a position on the bottom of basket 12 that is closer that front end of basket 12 as compared to the back end of basket 12.

With reference to FIG. 2, a second embodiment of the apparatus can be seen as designated by the numeral 26. Here, a truck bed 28 has a tailgate 30 pivotal at one end thereof of truck bed 28. A basket 32 has a receptacle 34 defined by an interior bottom surface 36 that curves upwardly at the rear end to a minimal depth, while extending downwardly toward the front to a maximum depth. Accordingly, the center of gravity of basket 32 will be rearward of the physical center of receptacle 34. Accordingly, a tipping of basket 32 will occur when the center of gravity extends just beyond the end of tailgate 30.

With continued reference to FIG. 2, it can be seen that a connector member 38, which may be a rod, rope, chain, or the like, has an end thereof retained by and slidingly received within a slot 40 in the side of basket 32. The opposite end of the connector 38 is appropriately secured at 42, which is preferably a tie-down loop or bracket that is common in the beds of pickup trucks, trailers, and the like.

As shown in FIG. 3, a third embodiment of an inertia-driven dump load apparatus for vehicles made in accordance with the present invention is designated generally by the numeral 44. As shown here, the exterior bottom surface 45 of basket 32 has an undercut 46 across a portion of said exterior bottom surface 45 thereof, defining a transverse lip 48 extending across exterior bottom surface 45. As shown in FIG. 3, tailgate 30 of truck bed 28 is raised such that the inertia-driven dump load apparatus 44 is retained fully within truck bed 28.

With reference now to FIG. 4, a fourth embodiment of the apparatus is shown as designated by the numeral 50 and is somewhat similar to the embodiments of FIGS. 2 and 3. As shown here, tailgate 30 has been lowered and basket 32 has been slid rearwardly until the center of gravity has passed the end of tailgate 30 causing basket 32 to tip downwardly with the edge of tailgate 30 rising across undercut 46 and into engagement with transverse lip 48. Here, a plurality of connector pins or eyelets 52 are positioned in spaced relationship with each other along the side or sides of basket 32. Connector 38 extends from an appropriate one of the connector pins or eyelets 52 to the appropriate tie-down loop 42 of truck bed 28. Again, it is most desirable that connector pins or eyelets 52 populate both longitudinal sides of basket 32 and that an appropriate one of them is connected to an associated connector 38 and tie-down loop 42 on each side of basket 32.

With reference now to FIG. 5, it can be seen that the numeral 54 designates yet another embodiment of the apparatus of the present invention. Again, interior bottom surface 36 curves upwardly at the rear of basket 32 with a full depth being present near the front. Accordingly, the center of gravity of basket 32, when containing material, will be near the front of basket 32. An eyelet 56 is provided at the front of basket 32 to allow for appropriate securing to trailer or truck bed by means of a rope, chain, cord or the like.

According to the embodiment of the present invention as shown in FIG. 5, a pair of rear skids or sleds 58 is positioned near the rear of basket 32, and a pair of forward skids or sleds 60 is provided at the front of basket 32. These skids 58, 60 are preferably formed of a low-friction material and are preferably smooth and clean, such as to ride easily upon and across the bed of a pickup truck or trailer. Accordingly, movement of basket 32 rearwardly can be easily achieved to the point where basket 32 tips to achieve the "dumping" function.

It is important to note that a defining aspect of the present invention is the lack of wheels or similar devices attached to the apparatus 10, 26, 44, 50, or 54 which would allow for the apparatus to "roll" out of the back of a vehicle bed. On a similar note, there are also no wheels or similar devices fixed in the vehicle bed which would allow for the apparatus to "roll" out of the back of vehicle.

Figure 7:
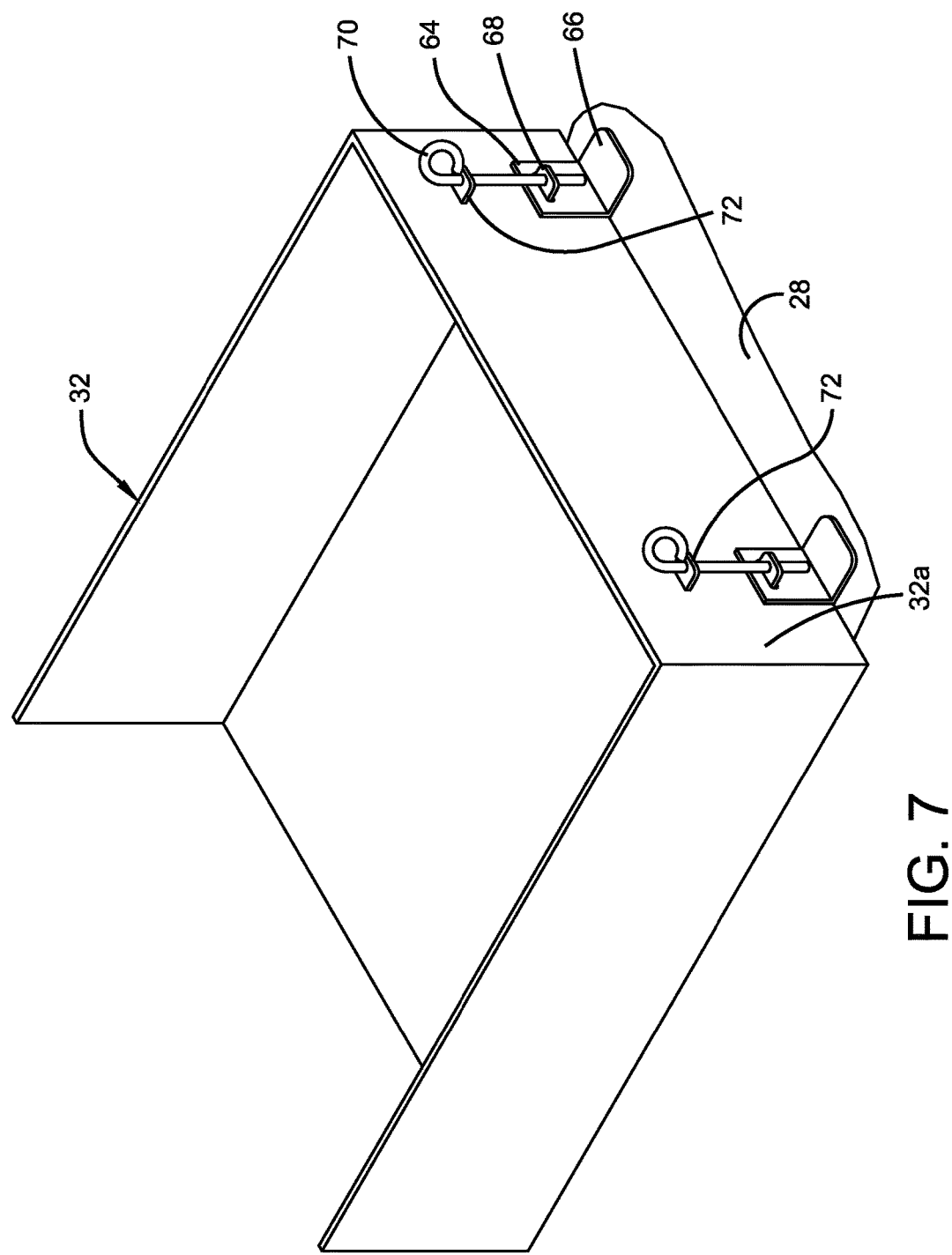
FIG. 7 is an illustrative view of a basket employed with the concept of the inertia-driven dump load apparatus for vehicles made in accordance with the invention showing the lock mechanism of FIG. 6 so as to lock in place the apparatus in the back of a pickup truck or trailer bed.

In one or more embodiments of the present invention, apparatus 10, 26, 44, 50, or 54 could include a layer of coated milled steel to protect basket 12, 32 of the apparatus from sharp objects dropped from an unrealistic height. In one or more embodiments of the present invention, as shown in FIGS. 6 and 7, it is also contemplated that at least one locking device 62 is attached to an exterior surface of a front wall 32a of basket 32 which will interact with truck bed 28 so as to prevent the apparatus from being thrown out of the bed in case of sudden maneuvers or the passing of the wheeled vehicle over rough terrain. Locking device 62 includes a vertical plate 64 that is attached to front wall 32a of basket 32, a horizontal plate 66 that is attached to truck bed 28, a locking pin eyelet 68, and a locking pin 70. In practice, the vertical plate 64 will be attached to front wall 32 of basket 32 by means of a bolt, screw, or other similar means of attachment and the horizontal plate 66 will be attached to truck bed 28 by means of a bolt, screw or other similar means of attachment. Once locking device 62 is secured to both basket 32 and truck bed 28, the apparatus can be further secured by placing a locking pin 70 within locking pin eyelet 68. Once the apparatus is in a position to be dumped, locking pin 70 is simply removed from locking pin eyelet 68 and dumping is commenced. It is also contemplated that an additional locking pin eyelet 72 could be attached to the exterior surface of front wall 32a at a position that is above locking device 62 and also in alignment with locking pin eyelet 68.

In operation, with any of the embodiments of the present invention having basket 12, 32 loaded and maintained in bed 28 of, for example, a pickup truck, tailgate 20, 30 of the pickup truck can be lowered and the pickup truck moved in reverse to the point where dumping is desired. At that point, the brakes are quickly applied such that basket 12, 32 moves by inertia across truck bed 28, preferably upon skids 58, 60 or sled 18 provided, to the point where the center of gravity of the material-filled basket 12, 32 passes beyond the edge of the lowered tailgate 20, 30 such that basket 12, 32 tips thereabout and slides downwardly until the edge of tailgate 20, 30 engages the lip of an undercut 46 (if present) on the exterior bottom surface 45 of basket 12, 32, at which time basket 12, 32 further pivots until the end thereof touches the ground and/or the appropriate connector 38 prevents further movement as a consequence of the interconnection between basket 12, 32 and a fixed point on truck or trailer bed 28. In any event, the material within basket 12, 32 may be quickly and easily "dumped." The empty apparatus 10, 26, 44, 50, 54 may be easily tipped upward so that it can be slid back into bed 28 of the truck, and then tailgate 20, 30 can be closed.

The present invention further contemplates that rearward movement and inertia of a pickup truck or trailer is not necessarily required to disengage basket 12, 32 from bed 28. When the truck or trailer is appropriately positioned at a dumping site, the operator may simply pull on the rear edge of basket 12, 32 urging the same across the bottom of the truck or trailer bed 28 upon the appropriate skids 58, 60 or sled 18 (if present) until the center line of basket 12, 32 is passed and basket 12, 32 tips to achieve the desired dumping.

It should now be appreciated that the present invention comprises a basket 12, 32 that slides out of a truck or trailer body under minimal inertia from either the vehicle itself or a mechanical effect such as pulling by a human operator. Of course, a crank or the like could also be employed. The invention contemplates that basket 12, 32 may comprise a rigid shape formed to fit a wide variety of truck or trailer bodies and various models thereof. It will be appreciated that various basket shapes and styles can be employed to tailor the baskets to particular vehicles, or a "one size fits all" shape/style may be used.

If present, skids 58, 60 or sled 18 are/is made of a rigid material that has a very low coefficient of friction to be slippery in order to ensure that basket 12, 32 slides easily over truck or trailer bed 28. It is further desired that basket 12, 32 has an interior finish that is such that it will not allow the material being transported to stick thereto. Most preferably, basket 12, 32 is configured such as to distribute the weight of the material being transported to accommodate and facilitate the movement of basket 12, 32 from truck or trailer bed 28. In this regard, it is preferable that the back end of basket 12, 32 have a curved bottom that not only serves to position the center of gravity of basket 12, 32 slightly forward of the physical center, but which also serves to prevent the materials being transported from spilling out during loading and transport, while also allowing the materials being transported to fall out easily when in the "dump" position. In other embodiments, instead of a curved bottom to prevent the materials being transported from spilling out during loading and transport, a flap of heavy plastic, for example, neoprene, could be installed at the back end of basket 12, 32.

The present invention further contemplates that basket 12, 32 may employ another type of traction-reducing element in place of skids 58, 60 or sled 18 discussed above. It is further contemplated that basket 12, 32 may have adjustable or add-on sidewalls to accommodate a larger load. In one or more embodiments, basket 12, 32 may also include anchoring devices to prevent movement of basket 12, 32 during transport, and further may employ special anchors to prevent basket 12, 32 from falling completely off of the truck or trailer body during the dumping operation. Basket 12, 32 may include a gate that hinges or folds down over the truck or trailer body and tailgate to prevent materials from falling between the body and the tailgate. If present, this gate may be made of an appropriate carpet, tarp, mat, or the like attached to basket 12, 32 and which rolls out over the truck tailgate to prevent material from spilling into the tailgate, tailgate hinge, or truck/trailer body.

Basket 12, 32 preferably includes cables or the like that attach to the trailer body or truck bed and prevent basket 12, 32 from falling out of the truck when dumping and during transportation. Basket 12, 32 may also have arms or other strapping that hangs down on both sides to catch the tailgate or some other stop to prevent basket 12, 32 from falling out during dumping. Basket 12, 32 may also have slots on either side in which the arms or strapping or cabling may slide to accommodate the correct length needed to allow basket 12, 32 to dump at a preferred angle of approximately 60° without tipping over the edge of the tailgate while dumping and while allowing basket 12, 32 to slide into the bed. If present, these arms may comprise grips that catch the tailgate and prevent basket 12, 32 from falling completely out of the truck or trailer body when dumping materials. The arms may be adjustable to accommodate different heights of trucks or trailers. The present invention may also employ an inclined liner or sled that may fit over the wheel housings to provide added dumping capabilities and features.

In light of the foregoing, it should be appreciated that the present invention significantly advances the art by providing an inertia-driven dump load apparatus for use in vehicles and a method of using the apparatus that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from claims that will follow in a non-provisional utility application.

What is claimed is:

1. A method of dumping material from a vehicle having a vehicle bed comprising the steps of:
    a. placing an inertia-driven dump load apparatus in the vehicle bed, wherein the material to be dumped is placed within said apparatus;
    b. moving the vehicle into a position where dumping is desired; and
    c. applying the brakes of the vehicle to impart a force to the apparatus such that said apparatus moves across the vehicle bed such that said apparatus tips from said vehicle bed so that the material to be dumped is dumped.

2. The method of claim 1 wherein prior to applying the brakes of the vehicle, a tailgate of said vehicle bed is lowered so that said apparatus may pass beyond said lowered tailgate to dump the material to be dumped.

3. The method of claim 1, wherein once the material to be dumped is dumped, a human operator simply places the apparatus back into the vehicle bed.

4. The method of claim 1 wherein the step of placing an inertia-driven dump load apparatus further comprises:
    a. providing a container defined by two side walls and a front wall; and
    b. providing at least one pivotable connection means connecting the container to the vehicle bed.

5. A method of dumping material from a vehicle having a bed comprising the steps of:
    a. placing an inertia-driven dump load apparatus in the vehicle bed, wherein the material to be dumped is placed within said apparatus, wherein said apparatus comprises a container defined by two side walls, a front wall, and an exterior bottom surface having an undercut across a portion thereof and defining a transverse lip thereacross, the container being connected to the vehicle bed by a pivotal connection;
    b. moving the vehicle into a position where dumping is desired; and c. applying the brakes of the vehicle to impart a force to the apparatus such that said apparatus moves across the vehicle bed until said pivotal connection and undercut causes the container to tip from said vehicle bed so that the material to be dumped is dumped.

\* \* \* \* \*